US006684135B2

(12) United States Patent
Uenodai et al.

(10) Patent No.: US 6,684,135 B2
(45) Date of Patent: Jan. 27, 2004

(54) CONTROL DEVICE FOR FUEL CELL VEHICLE

(75) Inventors: Asao Uenodai, Wako (JP); Shinji Yoshikawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 18 days.

(21) Appl. No.: 10/177,383

(22) Filed: Jun. 21, 2002

(65) Prior Publication Data

US 2002/0198636 A1 Dec. 26, 2002

(30) Foreign Application Priority Data

Jun. 22, 2001 (JP) .................................... 2001-189075
May 22, 2002 (JP) .................................... 2002-148260

(51) Int. Cl.[7] .......................... H01M 8/04; B60L 3/00; B60L 11/18; H02J 1/01
(52) U.S. Cl. ...................... 701/22; 180/65.3; 320/101
(58) Field of Search .................. 701/22, 29; 180/65.1, 180/65.2, 65.3, 65.8; 429/12, 22, 23; 320/101

(56) References Cited

U.S. PATENT DOCUMENTS

| 5,839,533 | A | * | 11/1998 | Mikami et al. | 180/165 |
| 6,223,106 | B1 | * | 4/2001 | Yano et al. | 701/22 |
| 6,326,763 | B1 | * | 12/2001 | King et al. | 320/101 |
| 6,497,974 | B2 | * | 12/2002 | Fuglevand | 429/22 |

FOREIGN PATENT DOCUMENTS

JP          07264715 A   * 10/1995   ........... B60L/11/18

* cited by examiner

Primary Examiner—William A. Cuchlinski, Jr.
Assistant Examiner—Eric Gibson
(74) Attorney, Agent, or Firm—Lahive & Cockfield, LLP

(57) ABSTRACT

Disclosed is a control device for a fuel cell vehicle which prevents that a fuel cell vehicle cannot run immediately after an abnormal condition of a fuel cell occurs. A current supply limiting unit 54 permits output current limiting means 30 to interrupt a current supplied from a fuel cell 2 to a capacitor 3 and a motor driver 5 when an upper limit amount of generated electric energy (Ifc_LMT) outputted from a fuel cell control unit 16 and indicative of an upper limit amount of electric energy generated by the fuel cell 2 is equal to a predetermined amount of generated electric energy or lower. When the upper limit amount of generated electric energy (Ifc_LMT) is equal to the predetermined amount of generated electric energy or lower and an output limit electric energy (PLD) is equal to a target output (PD_REQ) or lower, a necessary regenerative torque calculator 62 calculates necessary regenerative torque (REG_TRQ) so that a reactive gas supply device 21 can be operated by a regenerative electric energy generated in an electric motor 10. A torque command selector 63 outputs the necessary regenerative torque (REG_TRQ) as a torque command (TRQ_CMD) to the motor driver 5.

3 Claims, 4 Drawing Sheets

CONTROL DEVICE FOR FUEL CELL VEHICLE

BACKGROUND OF THE INVENTION

1. Field of the Invention

The present invention relates to a control device for a fuel cell vehicle using a fuel cell and an electric double layer capacitor, which are connected parallel to each other, as a power supply for a driving electric motor, and more particularly to a process of coping with the occurrence of an abnormal condition in the fuel cell.

2. Description of the Related Art

As a control device, mounted on a fuel cell vehicle, for controlling an output of a driving electric motor for the fuel cell vehicle, for example, a control device constituted as shown in FIG. 4 is known.

The control device shown in FIG. 4 has a motor driving unit 101 for supplying a driving electric energy to a driving electric motor 100 and a fuel cell 102 functioning as a power supply for an electric accessory such as an air-conditioner (not shown). An electric double layer capacitor 103 is connected parallel to the fuel cell 102. At the start time of the generation of an electric energy from the fuel cell 102, an electric energy is discharged from the electric double layer capacitor 103 to operate a reactive gas supply unit 104 which has an air compressor or the like and supplies reactive gases (hydrogen and air) to the fuel cell 102, so that the supply of the reactive gases to the fuel cell 102 is started.

An electric vehicle control unit 105 determines a target output (PD_REQ) of the electric motor 100 depending on a rotational speed (Nm) of the electric motor and the amount of depression (Ap) of an accelerator pedal.

A torque command determining unit 106, provided for the electric vehicle control unit 105, determines a torque command (TRQ_CMD) so that the electric motor 100 generates the target output (PD_REQ). A reactive-gas-supplied-amount determining unit 107, provided for the electric vehicle control unit 105, determines the supplied amount of reactive gases needed to achieve the target output (PD_REQ) and generates a signal indicative of a rotational speed (CMP_CMD) of an air compressor motor necessary to achieve the corresponding supplied amount of reactive gases. Consequently, the amount of generated electric energy depending on the target output (PD_REQ) can be obtained from the fuel cell 102, so that driving torque depending on the target output (PD_REQ) is generated from the electric motor 101.

However, in some cases, while the fuel cell vehicle is running, water which is produced by an electrochemical reaction of reactive gases remains in the fuel cell 102 to cause the occurrence of an abnormal condition in which the amount of electric energy generated by the fuel cell 102 decreases. While the target output (PD_REQ) is set at a high level as in the case of, for example, rapidly acceleration of the fuel cell vehicle, when the fuel cell 102 is in the abnormal condition and the amount of electric energy generated by the fuel cell 102 is lower than a level at which the electric energy necessary to operate the reactive gas supply unit 104 can be supplied, the electric energy discharged from the capacitor 103 is consumed by the motor driving unit 101 and the reactive gas supply unit 104, so that the electric energy charged into the capacitor 103 decreases abruptly.

As mentioned above, when the electric energy charged into the capacitor 103 decreases, there is the following disadvantage: It is difficult to keep the supply of the electric energy at a level necessary to drive the air compressor motor of the reactive gas supply unit 104. As a result, the fuel cell vehicle cannot run.

SUMMARY OF THE INVENTION

The present invention is made in order to solve the above disadvantage. It is an object of the present invention to provide a control device for a fuel cell vehicle, which suppresses such a fact that the fuel cell vehicle cannot run when an abnormal condition of a fuel cell is caused. There is provided a control device for a fuel cell vehicle, comprising: a fuel cell which is used as a power supply for a driving electric motor; an electric double layer capacitor, connected parallel to the fuel cell, for discharging for compensation for an insufficient electric energy when the amount of electric energy generated by the fuel cell is insufficient; reactive gas supply means, driven by an electric energy supplied from the fuel cell or the electric double layer capacitor, for supplying reactive gases to the fuel cell; and motor driving regenerative means, operated using the fuel cell and the electric double layer capacitor as a power supply, for regulating a driving electric energy supplied to the electric motor depending on a predetermined target torque to control driving torque generated in the electric motor and for regulating a regenerative electric energy recovered from the electric motor to the electric double layer capacitor to control regenerative torque generated in the electric motor.

The control device further comprises upper-limit-amount-of-generated-electric-energy recognizing means for recognizing the operating condition of the fuel cell to recognize the upper limit amount of electric energy generated by the fuel cell depending on the operating condition; current supply limiting means for limiting a current supplied from the fuel cell to the electric double layer capacitor and the motor driving regenerative means; capacitor-charging-amount-of-electric-energy recognizing means for recognizing the amount of electric energy charged into the electric double layer capacitor; and fuel cell abnormality countermeasure means for permitting the current supply limiting means to limit the current supplied from the fuel cell to the electric double layer capacitor and the motor driving regenerative means and permitting the reactive gas supply means to be driven by the regenerative electric energy of the electric motor when the upper limit amount of generated electric energy is equal to a predetermined amount of generated electric energy or lower and the amount of electric energy charged into the electric double layer capacitor is equal to a predetermined amount of charged electric energy or lower while the fuel cell vehicle is running.

According to the present invention, the fuel cell generates a current due to an electrochemical reaction of reactive gases. In some cases, water produced in association with the electrochemical reaction is not completely discharged from the fuel cell but the water remains in the fuel cell. The above-mentioned water remaining in the fuel cell interferes with the supply of the reactive gases to the fuel cell, resulting in a decrease in upper limit amount of electric energy generated by the fuel cell. The electric energy is discharged from the electric double layer capacitor for compensation for the insufficient amount of electric energy generated by the fuel cell, resulting in a decrease in amount of electric energy charged into the electric double layer capacitor. As a result, the fuel cell vehicle may not run.

While the fuel cell vehicle is running, when the upper limit amount of electric energy generated by the fuel cell is equal to the predetermined amount of generated electric energy or lower and the amount of electric energy generated by the fuel cell is equal to the predetermined amount of charged electric energy or lower, the fuel cell abnormality countermeasure means permits the current supply limiting means to limit the current supplied from the fuel cell to the electric double layer capacitor and the motor driving regenerative means and permits the reactive gas supply means to be driven by the regenerative electric energy of the electric motor.

As mentioned above, when the electric energy supplied from the fuel cell to the electric double layer capacitor and the motor driving regenerative means is limited, the amount of electric energy generated by the fuel cell decreases and the amount of reactive gases increases, the reactive gases being not consumed by the fuel cell but passing through the fuel cell as they are. Consequently, the discharge of water remaining in the fuel cell is advanced. The reactive gas supply means is operated by the regenerative electric energy generated in the electric motor produced by the running of the fuel cell vehicle, so that the advantages of advancing the discharge of water remaining in the fuel cell can be obtained continuously. Therefore, the recovery of the fuel cell to the normal condition is stimulated and such a fact that the fuel cell vehicle cannot run can be suppressed.

The fuel cell abnormality countermeasure means sets necessary regenerative torque as the target torque, the necessary regenerative torque being determined so that when the reactive gas supply means is driven by the regenerative electric energy of the electric motor, the amount of electric energy charged into the electric double layer capacitor is held at a level or higher, at which the electric double layer capacitor can supply an electric energy capable of operating the reactive gas supply means to the reactive gas supply means.

According to the present invention, when the fuel cell is not returned to the normal condition and the fuel cell vehicle stops running, the amount of electric energy charged into the electric double layer capacitor is held at the level at which the electric energy capable of operating the reactive gas supply means can be supplied to the reactive gas supply means. Accordingly, after the fuel cell is repaired or replaced with another one, the electric energy is supplied from the electric double layer capacitor to the reactive gas supply means to operate the reactive gas supply means, so that the generation of electric energy from the fuel cell can be started.

The control device further comprises speed detecting means for detecting a speed of the fuel cell vehicle. The fuel cell abnormality countermeasure means determines the necessary regenerative torque depending on the speed of the fuel cell vehicle.

According to the present invention, for example, when it is recognized on the basis of the speed detected by the speed detecting means that the fuel cell vehicle runs at high speed, the necessary regenerative torque is determined so as to prevent such a state that large regenerative torque is generated in the electric motor to abruptly brake the fuel cell vehicle. A change in motion of the fuel cell vehicle can be suppressed.

DESCRIPTION OF THE PREFERRED EMBODIMENT

Figure 1:
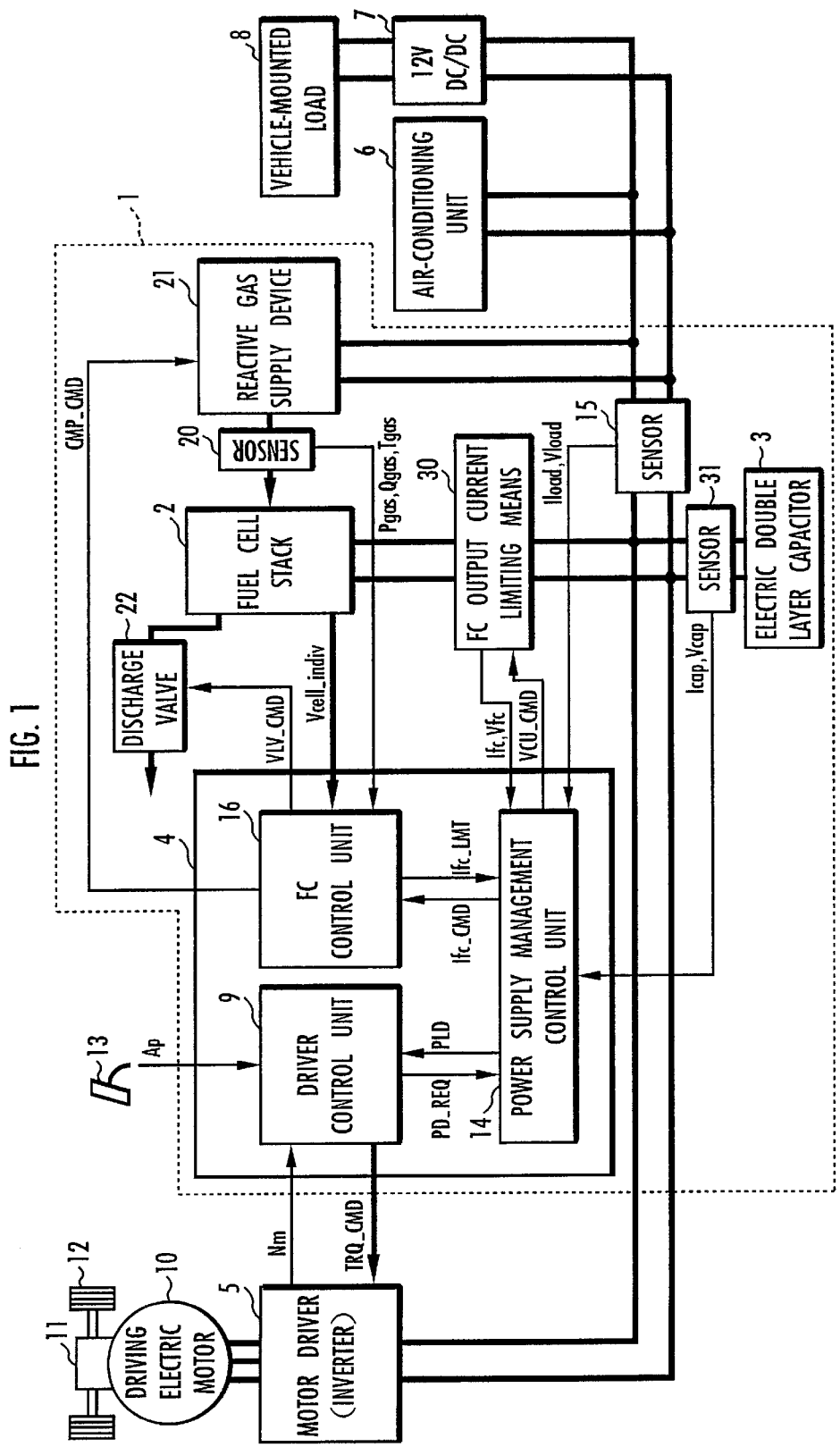
FIG. 1 is a block diagram showing the configuration of a control device for a fuel cell vehicle according to the present invention.
Figure 2:
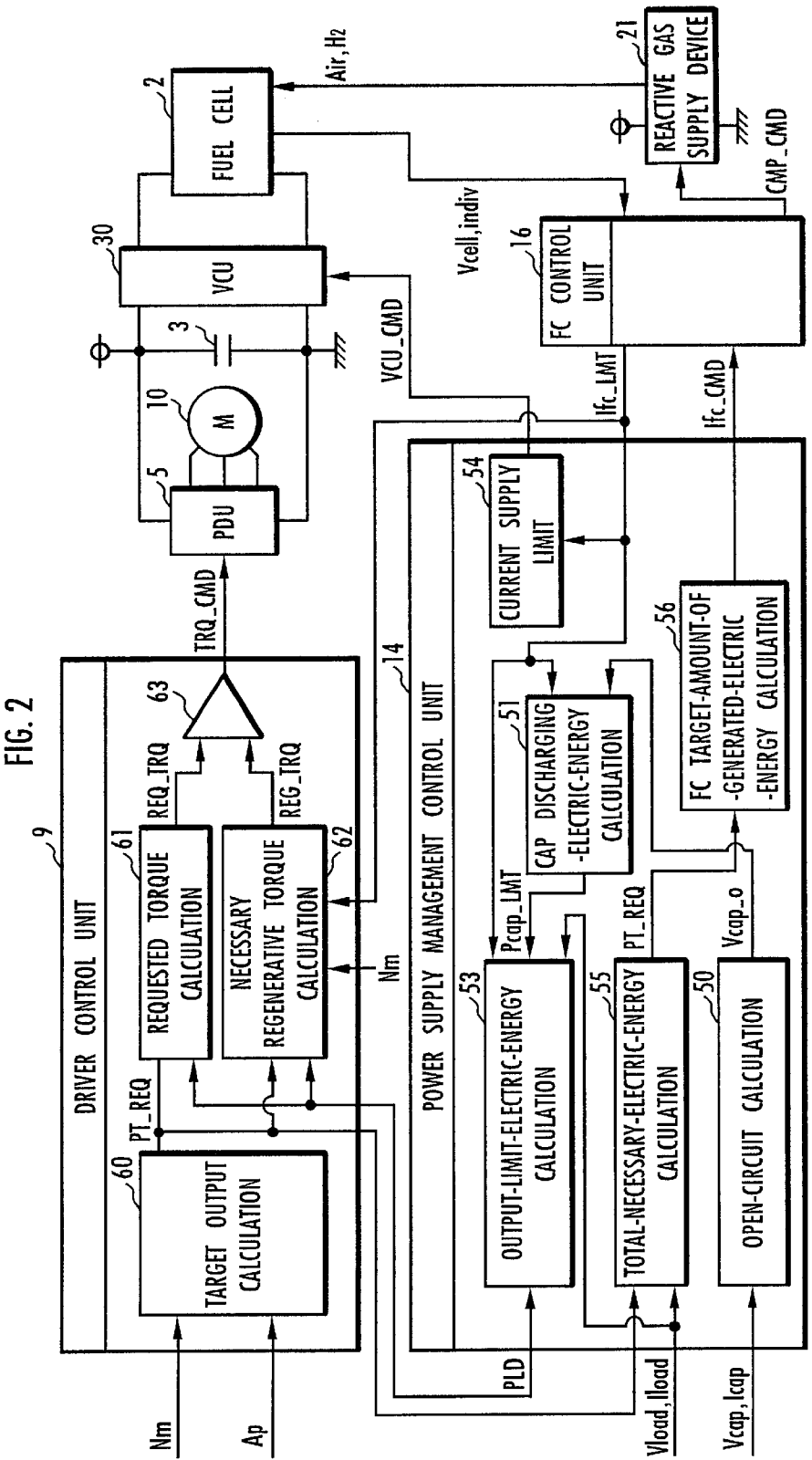
FIG. 2 is a block diagram showing the control arrangement of the control device shown in FIG. 1.
Figure 3:
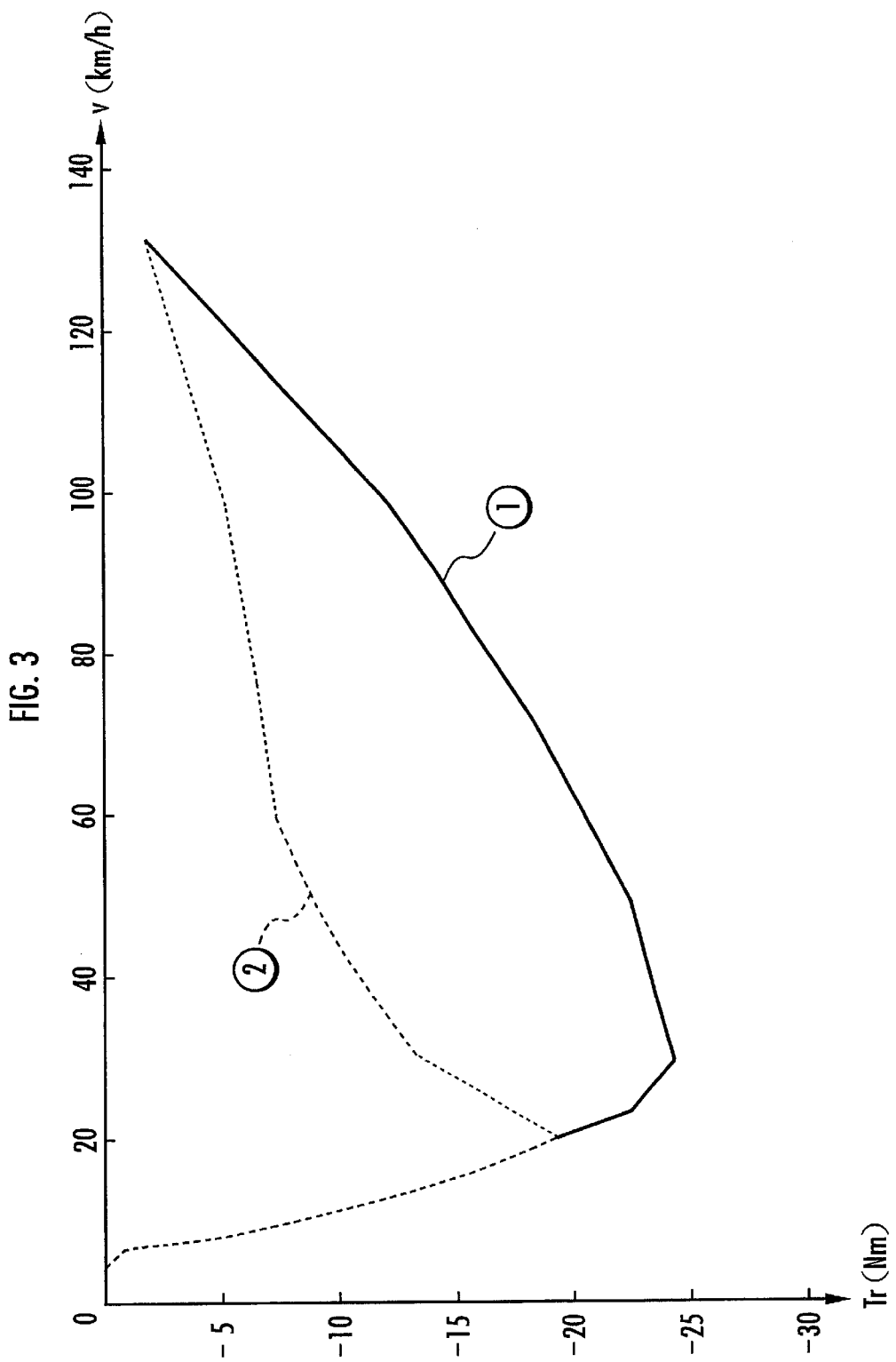
FIG. 3 is a graph showing a relation between a vehicle speed of the fuel cell vehicle and regenerative torque generated from an electric motor.
Figure 4:
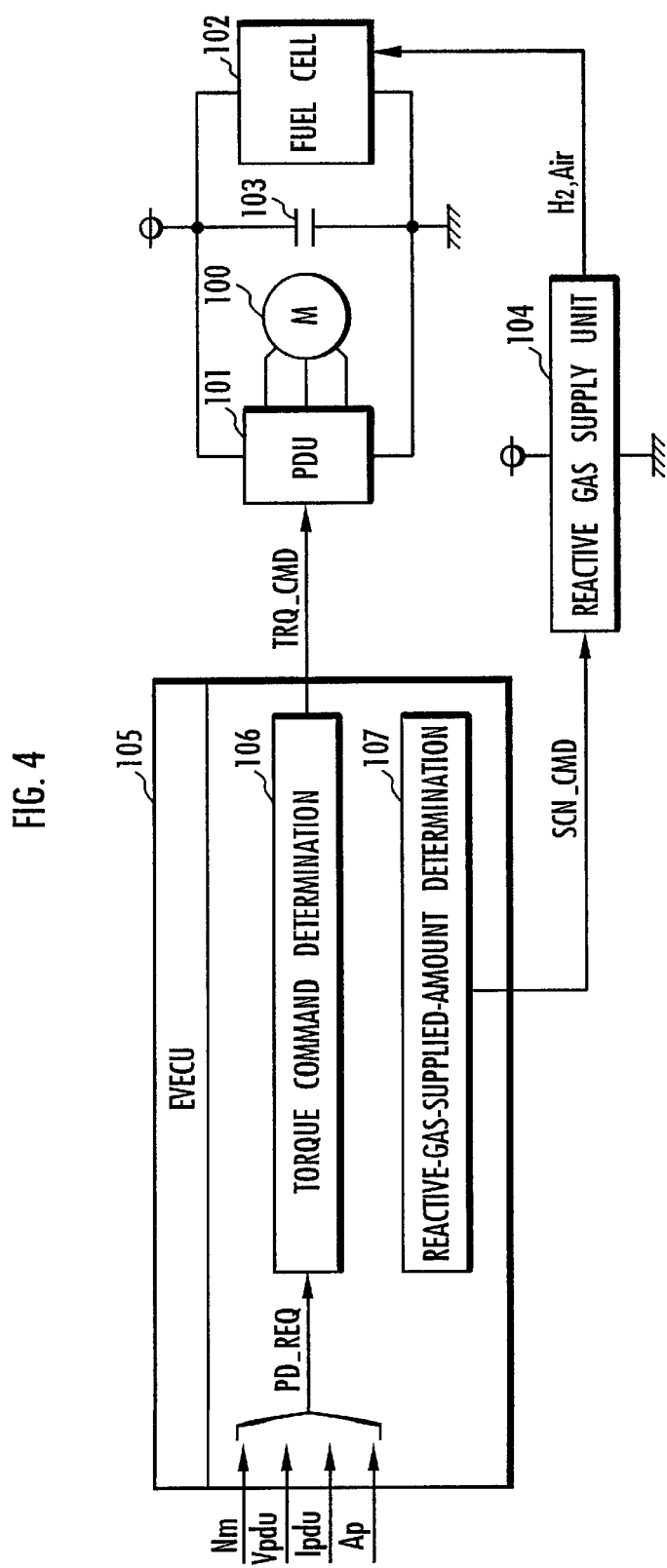
FIG. 4 is a block diagram showing the configuration of a conventional control device for a fuel cell vehicle.

An embodiment of the present invention will now be described with reference to FIGS. 1 to 3. FIG. 1 is a block diagram showing the configuration of a control device for a fuel cell vehicle according to the present invention. FIG. 2 is a block diagram showing the control arrangement of the control device shown in FIG. 1. FIG. 3 is a graph to determine regenerative torque of an electric motor depending on a vehicle speed of the fuel cell vehicle.

Referring to FIG. 1, a control device 1 for a fuel cell vehicle according to the present invention (hereinbelow, simply referred to as a control device 1) is mounted on a fuel cell vehicle and controls an electric energy supplied to the fuel cell vehicle. A controller 4 controls the operation of the control device 1. The controller 4 comprises a microcomputer, a memory, and other components.

A fuel cell 2 outputs an electric current based on an electrochemical reaction between reactive gases of hydrogen and air. The amount of electric energy generated by the fuel cell 2 is controlled by a power supply management control unit 14 and a fuel cell control unit 16 which are provided for the controller 4. A driver control unit 9 provided for the controller 4 determines a torque command for a driving electric motor 10 (hereinbelow, simply referred to as an electric motor 10).

An output electric energy produced by the fuel cell 2 and an electric double layer capacitor 3 (hereinbelow, simply referred to as a capacitor 3) is supplied to a motor driver 5 (corresponding to motor driving regenerative means according to the present invention), an air-conditioning unit 6, and a 12-V load 8 through a DC/DC converter 7.

The motor driver 5 controls driving torque and regenerative torque generated in the electric motor 10 depending on a torque command (TRQ_CMD: which corresponds to target torque according to the present invention) outputted from the driver control unit 9. The motor driver 5 controls currents flowing through armatures of the electric motor 10 through a semiconductor device such as a transistor or an FET.

When the torque command (TRQ_CMD) indicates a positive value (>0), the motor driver 5 regulates the driving electric energy supplied from the fuel cell 2 and the capacitor 3 to the armatures of the electric motor 10 to permit the electric motor 10 to generate the driving torque depending on the torque command (TRQ_CMD).

On the other hand, when the torque command (TRQ_CMD) denotes a negative value (<0), the motor driver 5 regulates a regenerative electric energy recovered from the electric motor 10 to the capacitor 3 to permit the electric motor 10 to generate the regenerative torque depending on the torque command (TRQ_CMD). When the driving torque is generated in the electric motor 10, a drive power is transferred to drive wheels 12 through a transmission 11. When the regenerative torque is generated in the electric motor 10, a brake power is transferred to the drive wheels 12 through the transmission 11.

The driver control unit 9 calculates a target output (PD_REQ) of the electric motor 10 based on the amount of depression (Ap) of an accelerator pedal 13 and a rotational speed (Nm) of the electric motor 10 and then outputs a signal indicative of the target output (PD_REQ) to the power supply management control unit 14. A rotational speed sensor (not shown), provided for the motor driver 5, for detecting the rotational speed (Nm) of the electric motor 10 corresponds to speed detecting means according to the present invention.

The power supply management control unit 14 is supplied with detected signals of a load current (Iload) and a load voltage (Vload) which are detected by a load sensor 15 in order to recognize the electric energy consumed by electric accessories other than the electric motor 10. The power supply management control unit 14 recognizes the electric energy consumed by the electric accessories other than the electric motor 10 on the basis of the detected signals.

In consideration of an upper limit amount of generated electric energy (Ifc_LMT) outputted from the fuel cell control unit 16 and indicative of an upper limit amount of electric energy generated by the fuel cell 2, a current (Icap) charged into and discharged from the capacitor 3, and a voltage (Vcap) across the capacitor 3, the current (Icap) and the voltage (Vcap) being detected by a capacitor sensor 31, the power supply management control unit 14 determines a target amount of generated electric energy (Ifc_CMD), which is a target value for a current outputted from the fuel cell 2, depending on the sum of the target output (PD_REQ) of the electric motor 10 and the electric energy consumed by the electric accessories other than the electric motor 10, and then outputs a signal indicative of the target amount of generated electric energy (Ifc_CMD) to the fuel cell control unit 16.

The power supply management control unit 14 outputs a signal indicative of an output limit electric energy (PLD), which represents an upper limit of the electric energy that can be supplied from the fuel cell 2 and the capacitor 3 to the motor driver 5, to the driver control unit 9.

The power supply management control unit 14 (including a function as upper-limit-amount-of-generated-electric-energy recognizing means according to the present invention) is supplied with detected signals outputted from a reactive gas sensor 20 and indicating a pressure (Pgas), a flow rate (Qgas), and a temperature (Tgas) of reactive gases (hydrogen and air) supplied to the fuel cell 2, and detected signals indicative of states (Vcell_indiv) of individual fuel cells (not shown) that make up the fuel cell 2. The fuel cell control unit 16 determines the upper limit amount of generated electric energy (Ifc_LMT) in consideration of the state of the fuel cell 2 as recognized from these detected signals.

The driver control unit 9 outputs the torque command (TRQ_CMD) to the motor driver 5 so that the electric energy consumed by the electric motor 10 and the motor driver 5 does not exceed the output limit electric energy (PLD) indicated by the power supply management control unit 14.

The fuel cell control unit 16 outputs a signal indicative of a target amount of reactive gases (CMP_CMD) supplied to the fuel cell 2 to a reactive gas supply device 21 (corresponding to reactive gas supply means according to the present invention) so that the fuel cell 2 will output a current for the target amount of generated electric energy (Ifc_CMD) outputted from the power supply management control unit 14. Consequently, the fuel cell 2 is supplied with air and hydrogen at a flow rate depending on the target amount of generated electric energy (Ifc_CMD).

Hydrogen supplied from the reactive gas supply device 21 is supplied to hydrogen electrodes of the fuel cell 2 through an ejector (not shown) and a humidifier (not shown), reacts electrically and chemically with oxygen in air supplied to air electrodes of the fuel cell 2, producing water which is discharged through a discharge valve 22. The opening of the discharge valve 22 is controlled by a control signal (VLV_CMD) supplied from the fuel cell control unit 16 in order to keep the pressure in the fuel cell 2 at a constant gradient depending on the target amount of generated electric energy (Ifc_CMD).

The fuel cell 2 has a water-cooled cooling unit (not shown). The fuel cell control unit 16 controls the flow rate and the temperature of cooling water supplied to the water-cooled cooling unit depending on the temperature of the cooling water supplied to the water-cooled cooling unit and the temperature of the cooling water discharged from the water-cooled cooling unit.

The control device 1 also has output current limiting means 30 (including a function as current supply limiting means according to the present invention) which has a switching device such as a transistor or an FET to limit a current outputted from the fuel cell 2 and detects an output current (Ifc) and an output voltage (Vfc) of the fuel cell 2.

The output current limiting means 30 turns on or off the current outputted from the fuel cell 2 depending on a level (high/low) of a current limit signal (VCU_CMD) outputted from the power supply management control unit 14.

Fundamentally, excepting the start time and the stop time of the fuel cell 2, the power supply management control unit 14 always sets the current limit signal (VCU_CMD) at a high level to turn on (energize) the output current limiting means 30, thereby keeping the directly coupling state of the fuel cell 2 and the capacitor 3.

In the directly coupling state, when the total amount of electric energy consumed by the electric motor 10 and the electric accessories other than the electric motor 10 increases, resulting in a decrease in output voltage of the fuel cell 2, a discharging current depending on a difference between an open-circuit voltage of the capacitor 3 and the output voltage of the fuel cell 2 is supplied to the electric motor 10 and the electric accessories other than the electric motor 10. On the other hand, when the total amount of consumed electric energy is reduced, resulting in an increase in output voltage of the fuel cell 2, a charging current depending on the difference between the open-circuit voltage of the capacitor 3 and the output voltage of the fuel cell 2 is supplied from the fuel cell 2 to the capacitor 3.

Consequently, in both the cases, the open-circuit voltage of the capacitor 3 becomes equivalent to the output voltage of the fuel cell 2. Therefore, it is unnecessary to cause the output voltage of the fuel cell 2 to match an open-circuit voltage of a battery by a large DC/DC converter which can switch a heavy current in a manner similar to a case where the battery, in which the open-circuit voltage does not change very much even if the remaining amount of charged electric energy changes, is connected parallel to the fuel cell 2.

Accordingly, the output current limiting means 30 may have a small switching device to limit the passage of the electric current between the capacitor 3 and the fuel cell 2 at the start time and the stop time of the fuel cell 2, at which the output current of the fuel cell 2 is small.

With the constitution described above, the target amount of reactive gases (CMP_CMD) is controlled so that the fuel cell 2 outputs a current depending on the target amount of generated electric energy (Ifc_CMD) determined based on the electric energy consumed by the electric accessories calculated on the basis of the target output (PD_REQ), the load current (Iload), and the load voltage (Vload) of the electric motor 10.

The driver control unit 9 determines the torque command (TRQ_CMD) depending on the target output (PD_REQ) so as not to exceed the output limit electric energy (PLD) calculated by the power supply management control unit 14. The motor driver 5 controls the armature currents of the electric motor 10 to cause the electric motor 10 to generate driving torque or regenerative torque depending on the torque command (TRQ_CMD).

However, while the fuel cell vehicle is running, water produced by the electrochemical reaction of the reactive gases in the fuel cell 2 remains in the fuel cell 2 in some cases. In this instance, the remaining water prevents the supply of reactive gases to the fuel cell 2, resulting in an abnormal condition in which the capacity for electric energy generation of the fuel cell 2 deteriorates. In some cases, impurities such as nitrogen and the like are mixedly supplied to the hydrogen electrodes from the air electrodes of the fuel cell 2 through a reactive membrane (MEA membrane). Since hydrogen passed through the hydrogen electrodes is returned to the hydrogen electrodes for reuse, the impurities are not discharged, but remain in the hydrogen electrodes. In this case as well, the capacity for electric energy generation of the fuel cell 2 deteriorates.

When the capacity for electric energy generation of the fuel cell 2 deteriorates, the fuel cell vehicle cannot run depending on the target output (PD_REQ). Depending on the degree of deterioration in the capacity for electric energy generation of the fuel cell 2, the fuel cell vehicle may not run.

The power supply management control unit 14 and the driver control unit 9 perform a process of returning the fuel cell 2 to the normal condition when the condition of the fuel cell 2 becomes abnormal to cause the capacity for electric energy generation of the fuel cell 2 to deteriorate. The process of returning the fuel cell 2 to the normal condition by the power supply management control unit 14 and the driver control unit 9 will now be described hereinbelow with reference to FIGS. 2 and 3.

Referring to FIG. 2, in consideration of the electric energy discharged from the capacitor 3, the power supply management control unit 14 calculates the output limit electric energy (PLD). In other words, first, an open-circuit voltage calculator 50 calculates an open-circuit voltage (Vcap_o) of the capacitor 3 on the basis of data indicating an internal resistance (Rcap) of the capacitor 3 stored in a memory, a capacitor voltage (Vcap), and a capacitor current (Icap) using the following equation (1).

$$Vcap\_o = Vcap + Icap \times Rcap \quad (1)$$

When the output voltage of the capacitor 3 is equivalent to an output voltage (Vfc_LMT) in the upper limit amount of generated electric energy (Ifc_LMT) obtained by applying the upper limit amount of generated electric energy (Ifc_LMT) to an output characteristic map with respect to the current/voltage of the fuel cell 2, stored in a memory, a capacitor-discharging-electric-energy calculator 51 calculates an upper-limit discharged electric energy (Pcap_LMT) as an electric energy generated from the capacitor 3 using the following equation (2).

$$Pcap\_LMT = (Vcap\_o - Vfc\_LMT) / Rcap \times Vfc\_LMT \quad (2)$$

A output-limit-electric-energy calculator 53 subtracts the electric energy (=Vload×Iload) consumed by the electric accessories from the sum of the output electric energy of the fuel cell 2 depending on the upper limit amount of generated electric energy (Ifc_LMT) and the upper-limit electric energy (Pcap_LMT) discharged from the capacitor 3, thereby calculating the output limit electric energy (PLD). Accordingly, the output limit electric energy (PLD) is set in consideration of the electric energy discharged from the capacitor 3.

A current supply limiting unit 54 monitors the upper limit amount of generated electric energy (Ifc_LMT) while the fuel cell vehicle is running. When the upper limit amount of generated electric energy (Ifc_LMT) is equal to a predetermined amount of generated electric energy or lower, the current supply limiting unit 54 determines the abnormal condition in which water produced by the electrochemical reaction of the reactive gases remains in the fuel cell 2 to cause the capacity for electric energy generation of the fuel cell 2 to deteriorate.

When determining the abnormal condition of the fuel cell 2 as mentioned above, the current supply limiting unit 54 generates to the output current limiting means 30 the current limit signal (VCU_CMD) to interrupt (corresponding to "limit" the current supply according to the present invention) the current from the fuel cell 2 to the capacitor 3 and the motor driver 5.

Consequently, the current supply from the fuel cell 2 to the capacitor 3 and the motor driver 5 is interrupted, thereby interrupting the generation of electric energy from the fuel cell 2. The fuel cell control unit 16 opens both of a discharge valve for the air electrodes and a discharge valve for the hydrogen electrodes, which is usually closed, in the discharge valve 22 for the fuel cell 2. As a result, air and hydrogen (H$_2$) supplied from the reactive gas supply device 21 pass through the fuel cell 2 without being consumed by the fuel cell 2 and are then discharged from the fuel cell 2, so that an effect of discharging water remaining in the fuel cell 2 is enhanced.

The driver control unit 9 comprises a target output calculator 60, a requested torque calculator 61, a necessary regenerative torque calculator 62, and a torque command selector 63.

The target output calculator 60 calculates the target output (PD_REQ) of the electric motor 10 on the basis of the amount of depression (Ap) of the accelerator pedal 13 (refer to FIG. 1) and the rotational speed (Nm) of the electric motor 10. Since the rotational speed (Nm) of the electric motor 10 is proportional to the vehicle speed of the fuel cell vehicle, the driver control unit 9 can recognize the vehicle speed of the fuel cell vehicle on the basis the rotational speed (Nm) of the electric motor 10.

As requested torque (REQ_TRQ), the requested torque calculator 61 calculates the torque of the electric motor 10 needed to generate the target output (PD_REQ) from the electric motor 10. The necessary regenerative torque calculator 62 monitors the upper limit amount of generated electric energy (Ifc_LMT) outputted from the fuel cell control unit 16 while the fuel cell vehicle is running. When the upper limit amount of generated electric energy (Ifc_LMT) is equal to the predetermined amount of generated electric energy or lower and the output limit electric energy (PLD) is not enough with respect to the target output (PD_REQ), the necessary regenerative torque calculator 62 calculates necessary regenerative torque (REG_TRQ) depending on the vehicle speed of the fuel cell vehicle recognized by the rotational speed (Nm) of the electric motor 10.

When the necessary regenerative torque calculator 62 does not output the necessary regenerative torque (REG_TRQ), the torque command selector 63 outputs the requested torque (REQ_TRQ) outputted from the requested torque calculator 61 as the torque command (TRQ_CMD) to the motor driver 5. On the other hand, when the necessary regenerative torque calculator 62 outputs the necessary regenerative torque (REG_TRQ), the torque command selector 63 outputs the necessary regenerative torque (REG_TRQ) as the torque command (TRQ_CMD) to the motor driver 5.

Therefore, while the fuel cell vehicle is running, when the upper limit amount of generated electric energy (Ifc_LMT) is equal to the predetermined amount of electric energy or lower and the output limit electric energy (PLD) is not enough with respect to the target output (PD_REQ), the torque command (TRQ_CMD) is forcedly switched from the requested torque (REQ_TRQ) to the necessary regenerative torque (REG_TRQ).

In this instance, if the upper limit amount of generated electric energy (Ifc_LMT) is equal to the predetermined amount of generated electric energy or lower, so long as the output limit electric energy (PLD) calculated on the basis of the upper limit amount of electric energy (Ifc_LMT) generated by the fuel cell 2 and the upper limit of electric energy (Pcap_LMT) discharged from the capacitor 3 is larger than the target output (PD_REQ), that is, the target output (PD_REQ) is obtained by assist through the electric energy discharged from the capacitor 3, the necessary regenerative torque calculator 62 does not calculate the necessary regenerative torque (REG_TRQ).

Accordingly, the torque command (TRQ_CMD) is held not to the necessary regenerative torque (REQ_TRQ) but to the requested torque (REQ_TRQ). Therefore, even when the fuel cell 2 is in the abnormal condition, the electric motor 10 is continuously driven on the basis of the requested torque (REQ_TRQ) as long as possible.

The upper limit amount of electric energy (Pcap_LMT) discharged from the capacitor 3 varies depending on the amount of electric energy charged into the capacitor 3. Accordingly, the amount of electric energy, which is obtained by subtracting an electric energy corresponding to the upper limit amount of electric energy (Ifc_LMT) generated by the fuel cell 2 from the output limit electric energy (PLD), corresponds to the amount of electric energy charged into the capacitor according to the present invention, and the amount of electric energy, which is obtained by subtracting an electric energy corresponding to the upper limit amount of electric energy (Ifc_LMT) generated by the fuel cell 2 from the target output (PD_REQ), corresponds to the predetermined amount of charged electric energy according to the present invention. In other words, when the output limit electric energy (PLD) is larger than the target output (PD_REQ), the amount of electric energy charged into the capacitor 3 is larger than the predetermined amount of charged electric energy according to the present invention.

Accordingly, the capacitor-discharging-electric-energy calculator 51 corresponds to capacitor-discharging-amount recognizing means according to the present invention. The current supply limiting unit 54 and the necessary regenerative torque calculator 62 constitute fuel cell abnormality countermeasure means according to the present invention.

The necessary regenerative torque (REG_TRQ) is determined so that the reactive gas supply device 21 can be operated by the regenerative electric energy generated from the electric motor 10 and the capacitor 3 can be charged with the regenerative electric energy generated from the electric motor 10 at a level at which the reactive gas supply device 21 can be operated by the electric energy discharged from the capacitor 3.

Specifically, the necessary regenerative torque calculator 62 applies the vehicle speed recognized from the rotational speed (Nm) of the electric motor 10 to a correlation map between the vehicle speed and the necessary regenerative torque (REQ_TRQ), stored in a memory, to determine the necessary regenerative torque (REG_TRQ).

FIG. 3 shows a graph representing the correlation between the vehicle speed of the fuel cell vehicle and the necessary regenerative torque (REG_TRQ). The axis of ordinate denotes the necessary regenerative torque (REQ_TRQ) and the axis of abscissa denotes a vehicle speed (v). In FIG. 3, a curve (1) shows the relation between the regenerative torque, which is set when the driver returns the accelerator pedal 13 (refer to FIG. 1) during normal running, and the vehicle speed and a curve (2) shows the relation between the regenerative torque specified in the foregoing correlation map and the vehicle speed.

As shown in the graph, when the fuel cell 2 is in the abnormal condition, the necessary regenerative torque (REG_TRQ) calculated by the necessary regenerative torque calculator 62 is smaller than the regenerative torque set during the normal running. Accordingly, the brake power applied to the drive wheels 12 (refer to FIG. 1) decreases, so that a change in motion of the fuel cell vehicle is suppressed and the distance, in which the fuel cell vehicle is permitted to run until the vehicle stops, is extended.

The reactive gas supply device 21 can be operated continuously by the regenerative electric energy generated in the electric motor 10 until the fuel cell vehicle stops after the fuel cell 2 is in the abnormal condition. Accordingly, the effect of advancing the discharge of water remaining in the fuel cell 2 can be obtained continuously. The water remaining in the fuel cell 2 is discharged, the fuel cell 2 is returned to the normal condition, and after that, the fuel cell vehicle can run again in the normal condition.

In the case where the fuel cell 2 is not returned to the normal condition and the fuel cell vehicle then stops, the amount of electric energy charged into the capacitor 3 is held at a level or higher at which the reactive gas supply device 21 can be operated. Therefore, after the fuel cell 2 is replaced with another one or is repaired, the reactive gas supply device 21 and the air-conditioning unit 6 are operated by the electric energy discharged from the capacitor 3, so that the generation of electric energy from the fuel cell 2 can be started.

According to the present embodiment, the necessary regenerative torque calculator 62 calculates the necessary regenerative torque (REG_TRQ) so that the reactive gas supply device 21 can be operated by the regenerative electric energy generated in the electric motor 10 and the capacitor 3 is charged up to a level at which the reactive gas supply device 21 can be operated by the electric energy discharged from the capacitor 3. Furthermore, in order to suppress a change in motion of the fuel cell vehicle, the necessary regenerative torque (REG_TRQ) is set smaller than that upon normal running in accordance with the vehicle speed. In this manner, the most preferable advantages of the present invention are obtained.

The advantages of the present invention are also effective even if the necessary regenerative torque (REG_TRQ) is simply calculated so that the reactive gas supply device 21 can be operated by the regenerative electric energy generated in the electric motor 10. The advantages of the present invention are also effective even if the necessary regenerative torque (REG_TRQ) is simply calculated so that the reactive gas supply device 21 can be operated by the regenerative electric energy generated in the electric motor 10 and the capacitor 3 is charged up to a level at which the reactive gas supply device 21 can be operated by the electric energy discharged from the capacitor 3.

What is claimed is:

1. A control device for a fuel cell vehicle, comprising:

a fuel cell which is used as a power supply for a driving electric motor;

an electric double layer capacitor, connected parallel to the fuel cell, for discharging for compensation for an insufficient electric energy when the amount of electric energy generated by the fuel cell is insufficient;

reactive gas supply means, driven by an electric energy that is supplied from the fuel cell or the electric double layer capacitor, for supplying reactive gases to the fuel cell;

motor driving regenerative means, operated using the fuel cell and the electric double layer capacitor as a power supply, for regulating a driving electric energy supplied to the motor depending on a predetermined target torque to control driving torque generated in the electric motor and for regulating a regenerative electric energy recovered from the electric motor to the electric double layer capacitor to control regenerative torque generated in the electric motor;

upper-limit-amount-of-generated-electric-energy recognizing means for recognizing the operating condition of the fuel cell to recognize the upper limit amount of electric energy generated by the fuel cell depending on the operating condition;

current supply limiting means for limiting a current supplied from the fuel cell to the electric double layer capacitor and the motor driving regenerative means;

capacitor-charging-amount-of-electric-energy recognizing means for recognizing the amount of electric energy charged into the electric double layer capacitor; and fuel cell abnormality countermeasure means for permitting the current supply limiting means to limit the current supplied from the fuel cell to the electric double layer capacitor and the motor driving regenerative means and permitting the reactive gas supply means to be driven by the regenerative electric energy of the electric motor when the upper limit amount of generated electric energy is equal to a predetermined amount of generated electric energy or lower and the amount of electric energy charged into the electric double layer capacitor is equal to a predetermined amount of charged electric energy or lower while the fuel cell vehicle is running.

2. The device according to claim 1, wherein the fuel cell abnormality countermeasure means sets necessary regenerative torque as the target torque, the necessary regenerative torque being determined so that when the reactive gas supply means is driven by the regenerative electric energy of the electric motor, the amount of electric energy charged into the electric double layer capacitor is held at a level or higher at which the electric double layer capacitor can supply an electric energy capable of operating the reactive gas supply means to the reactive gas supply means.

3. The device according to claim 2, further comprising:

speed detecting means for detecting a speed of the fuel cell vehicle, wherein the fuel cell abnormality countermeasure means determines the necessary regenerative torque depending on the speed detected by the speed detecting means.

* * * * *